United States Patent [19]
Reed

[11] Patent Number: 6,028,728
[45] Date of Patent: Feb. 22, 2000

[54] SAMPLED AMPLITUDE READ/WRITE CHANNEL EMPLOYING A SUB-BAUD RATE WRITE CLOCK

[75] Inventor: David E. Reed, Westminster, Colo.

[73] Assignee: Cirrus Logic, Inc., Fremont, Calif.

[21] Appl. No.: 09/007,082

[22] Filed: Jan. 14, 1998

[51] Int. Cl.$^7$ .................................................. G11B 5/09
[52] U.S. Cl. ............................................................ 360/51
[58] Field of Search ................................ 360/45, 46, 51; 369/59, 60

[56] References Cited

U.S. PATENT DOCUMENTS

| | | | |
|---|---|---|---|
| 5,220,583 | 6/1993 | Solomon | 375/82 |
| 5,291,499 | 3/1994 | Behrens et al. | 371/43 |
| 5,424,881 | 6/1995 | Behrens et al. | 360/40 |
| 5,517,146 | 5/1996 | Yamasaki | 327/276 |
| 5,583,705 | 12/1996 | Ziperovich et al. | 360/45 |
| 5,696,639 | 12/1997 | Spurbeck et al. | 360/51 |
| 5,754,593 | 5/1998 | Koren | 375/263 |

OTHER PUBLICATIONS

U.S. application No. 08/681,578, Reed et al., filed Jul. 29, 1996.

Jan W. M. Bergmans, "A Partial Response Decoding of Rate 1/2 Modulation Codes for Digital Storage" *IEEE Transactions On Communications*, vol. 39, No. 11, pp. 1569–1581, Nov. 1991.

Jan W. M. Bergmans, "A Partial Receiver For Miller-Squared Encoded Signals with Half the Usual Operating Speed", *IEEE Transactions on Magnetics*, vol. 26, No. 5, Sep. 1990.

*Primary Examiner*—W. Chris Kim
*Attorney, Agent, or Firm*—Howard H. Sheerin; Dan Shifrin

[57] ABSTRACT

A sub-baud rate write circuit is disclosed which writes RLL encoded channel data to a disk storage medium using a write clock frequency significantly below the baud rate. This allows for a higher channel data rate without increasing the cost and complexity of the write circuitry. The write circuitry operates by re-encoding the RLL encoded channel data according to a particular mapping to generate write data at the write clock rate, and then writing the write data to the disk at appropriate phase delays. The phase delays are generated by passing the write clock through an array of delay circuits. The resulting write signal is the same as if the RLL encoded data were written to the disk using a baud rate write clock. The write circuitry of the present invention is ideally suited for use in a sub-sampled read/write channel where the object is to reduce the cost and complexity by clocking the entire channel at a frequency significantly below the baud rate.

23 Claims, 11 Drawing Sheets

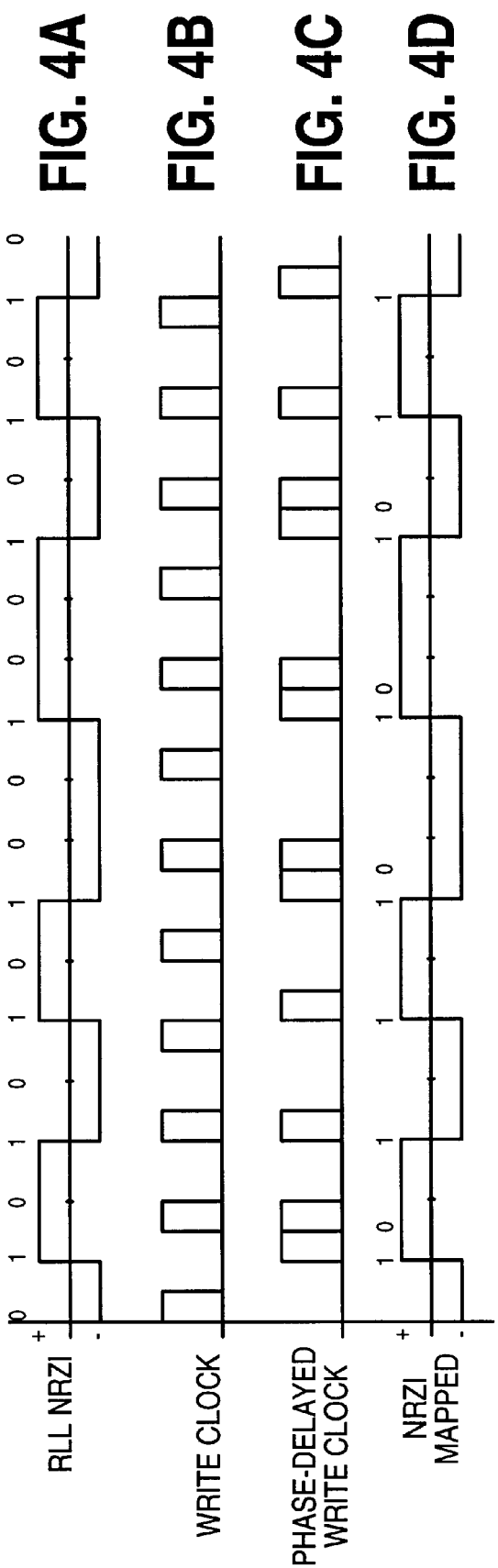

SAMPLED AMPLITUDE READ/WRITE CHANNEL EMPLOYING A SUB-BAUD RATE WRITE CLOCK

CROSS REFERENCE TO RELATED APPLICATIONS AND PATENTS

This application is related to several co-pending U.S. patent applications, namely application Ser. No. 08/681,578 entitled "SUB-SAMPLED DISCRETE TIME READ CHANNEL FOR COMPUTER STORAGE SYSTEMS," and application Ser. No. 08/876,054 entitled "ADAPTIVE EQUALIZATION IN A SUB-SAMPLED READ CHANNEL FOR DISK STORAGE SYSTEMS." The above-identified U.S. patent applications are incorporated herein by reference.

FIELD OF INVENTION

The present invention relates to the control of storage systems for digital computers (such as magnetic and optical disk drives), particularly to a sampled amplitude read/write channel that writes encoded data to a disk storage medium at a predetermined baud rate using a sub-baud rate write clock.

BACKGROUND OF THE INVENTION

The process of writing binary computer data to a disk storage device (such as a magnetic or optical disk drive) entails altering a surface characteristic of the disk using an analog carrier signal modulated by the binary data to be recorded. In magnetic disk storage devices, for example, the binary data may modulate the current in the coil of a write head in order to magnetize the surface of the disk in a forward or reverse direction along a concentric data track. For example, a "1" bit may modulate a change of polarity in the current to write a magnetic transition onto the disk, and a "0" bit may modulate no transition (i.e., NRZI encoding). This type of magnetic recording is referred to as "saturation recording" because the magnetization is saturated in one direction or the other as the write head passes over the centerline of the data track during a write operation.

To read the data stored on a particular data track, a read head is aligned over a centerline of the appropriate track in order to transduce the surface alterations into an analog read signal that is ultimately demodulated into an estimated data sequence representing the recorded data. In magnetic disk recording, for example, the read head may comprise a coil which inductively senses the change in the magnetization along the centerline of the track, thereby inducing an analog current in the coil. A magnetic transition induces a pulse in the analog read signal with a polarity corresponding to the direction of the transition. If, for example, a forward-to-reverse transition induces a positive pulse, then a reverse-to-forward transition induces a negative pulse. The pulses in the analog read signal are evaluated (demodulated) in an attempt to estimate the binary data sequence that was originally recorded.

Detecting and demodulating the pulses into the estimated binary sequence can be performed by a simple peak detector in a conventional analog read/write channel or, as in more recent designs, by a discrete time sequence detector in a sampled amplitude read/write channel. Discrete time sequence detectors are preferred over simple analog pulse detectors because they compensate for intersymbol interference (ISI) and are less susceptible to channel noise. Consequently, discrete time sequence detectors increase the capacity and reliability of the storage system.

There are several well known discrete time sequence detection methods including discrete time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF). The principles disclosed herein are applicable regardless as to the particular discrete-time sequence detection method employed. The present invention can be used with the above-identified sequence detection methods as well as others not mentioned, and even future techniques. Furthermore, it is contemplated that the present invention is preferably used in a sub-sampled read/write channel, the details for which are described below. However, sub-sampling is not a necessary limitation of the present invention; the general technique described below for writing data to the disk storage medium may be employed in a conventional synchronous sampling read/write channel, or even an analog peak detect read/write channel.

In a conventional peak detection read/write channel, analog circuitry detects peaks in the continuous time analog read signal generated by the read head. The analog read signal is "segmented" into bit cell periods and interpreted during these segments of time. The presence of a peak during the bit cell period is detected as a "1" bit, whereas the absence of a peak is detected as a "0" bit. The most common errors in detection occur when the bit cells are not correctly aligned with the analog pulse data. Timing recovery, then, adjusts the bit cell periods so that the peaks occur in the center of the bit cells on average in order to minimize detection errors. Since timing information is derived only when peaks are detected, the input data stream is normally run-length limited (RLL) to limit the number of consecutive "0" bits.

As the pulses are packed closer together on the data tracks in the effort to increase data density, detection errors can also occur due to intersymbol interference (ISI), a distortion in the read signal caused by closely spaced, overlapping pulses. This interference can cause a peak to shift out of its bit cell, or its magnitude to decrease, resulting in a detection error. This ISI effect is reduced by decreasing the data density or by employing an encoding scheme that ensures a minimum number of "0" bits occur between "1" bits. For example, a (d,k) run length limited (RLL) code constrains to d the minimum number of "0" bits between "1" bits, and to k the maximum number of consecutive "0" bits. A typical (1,7) RLL 2/3 rate code encodes 8 bit data words into 12 bit codewords to satisfy the (1,7) constraint.

Sampled amplitude detection, such as partial response (PR) with Viterbi detection, allows for increased data density by compensating for intersymbol interference and the effect of channel noise. Unlike conventional peak detection systems, sampled amplitude recording detects digital data by interpreting, at discrete time instances, the actual value of the pulse data. To this end, the read/write channel comprises a sampling device for sampling the analog read signal, and a timing recovery circuit for synchronizing the samples to the baud rate (code bit rate). Before sampling the pulses, a variable gain amplifier adjusts the read signal's amplitude to a nominal value, and a low pass analog filter filters the read signal to attenuate channel and aliasing noise. After sampling, a discrete-time equalizer equalizes the sample values according to a desired partial response, and a discrete-time sequence detector, such as a Viterbi detector, interprets the equalized sample values in context to determine a most likely sequence for the digital data (i.e., using maximum likelihood sequence detection (MLSD), or an approximation thereof). MLSD takes into account the effect of ISI and channel noise in the detection algorithm, thereby decreasing the probability of a detection error. This increases the effective signal to noise ratio and, for a given (d,k) constraint, allows for significantly higher data density as compared to conventional analog peak detection read/write channels.

The application of sampled amplitude techniques to digital communication channels is well documented. See Y. Kabal and S. Pasupathy, "Partial Response Signaling", *IEEE Trans. Commun. Tech.*, Vol. COM-23, pp.921–934, September 1975; and Edward A. Lee and David G. Messerschmitt, "Digital Communication", Kluwer Academic Publishers, Boston, 1990; and G. D. Forney, Jr., "The Viterbi Algorithm", *Proc. IEEE*, Vol. 61, pp. 268–278, March 1973.

Applying sampled amplitude techniques to magnetic storage systems is also well documented. See Roy D. Cideciyan, Francois Dolivo, Walter Hirt, and Wolfgang Schott, "A PRML System for Digital Magnetic Recording", *IEEE Journal on Selected Areas in Communications*, Vol. 10 No. 1, January 1992, pp.38–56; and Wood et al, "Viterbi Detection of Class IV Partial Response on a Magnetic Recording Channel", *IEEE Trans. Commun.*, Vol. Com-34, No. 5, pp. 454–461, May 1986; and Coker Et al, "Implementation of PRML in a Rigid Disk Drive", *IEEE Trans. on Magnetics*, Vol. 27, No. 6, November 1991; and Carley et al, "Adaptive Continous-Time Equalization Followed By FDTS/DF Sequence Detection", *Digest of The Magnetic Recording Conference*, Aug. 15–17, 1994, pp. C3; and Moon et al, "Constrained-Complexity Equalizer Design for Fixed Delay Tree Search with Decision Feedback", *IEEE Trans. on Magnetics*, Vol. 30, No. 5, September 1994; and Abbott et al, "Timing Recovery For Adaptive Decision Feedback Equalization of The Magnetic Storage Channel", *Globecom'90 IEEE Global Telecommunications Conference* 1990, San Diego, Calif., November 1990, pp.1794–1799; and Abbott et al, "Performance of Digital Magnetic Recording with Equalization and Offtrack Interference", *IEEE Transactions on Magnetics*, Vol. 27, No. 1, January 1991; and Cioffi et al, "Adaptive Equalization in Magnetic-Disk Storage Channels", *IEEE Communication Magazine*, February 1990; and Roger Wood, "Enhanced Decision Feedback Equalization", *Intermag'90*.

Similar to conventional peak detection systems, sampled amplitude detection requires timing recovery in order to correctly extract the digital sequence. Rather than process the continuous signal to align peaks to the center of bit cell periods as in peak detection systems, sampled amplitude systems synchronize the pulse samples to the baud rate. In conventional sampled amplitude read/write channels, timing recovery synchronizes a sampling clock by minimizing an error between the signal sample values and estimated sample values. A pulse detector or slicer determines the estimated sample values from the read signal samples. Even in the presence of ISI the sample values can be estimated and, together with the signal sample values, used to synchronize the sampling of the analog pulses in a decision-directed feedback system.

A phase-locked-loop (PLL) normally implements the timing recovery decision-directed feedback system. The PLL comprises a phase detector for generating a phase error estimate based on the difference between the estimated samples and the read signal samples. A PLL loop filter filters the phase error, and the filtered phase error operates to synchronize the channel samples to the baud rate.

Conventionally, the phase error adjusts the frequency of a sampling clock which is typically the output of a variable frequency oscillator (VFO). The output of the VFO controls a sampling device, such as an analog-to-digital (A/D) converter, to synchronize the sampling to the baud rate.

Partial response (PR) with Viterbi detection, as mentioned above, is a common method employed in sampled amplitude read/write channels for detecting the recorded digital data from the synchronous sample values. The most common Viterbi type sequence detection methods include: d=0 rate 8/9 PR4, a cost effective implementation requiring only two sliding threshold detectors; and d=1 rate 2/3 EPR4/EEPR4, an implementation which improves the bit error rate (BER) at higher densities but requires a more sophisticated add/compare/select (ASC) type of sequence detector.

The d=1 constraint in the EPR4/EEPR4 read/write channels increases the minimum distance of the corresponding trellis code (and thus decreases the BER), and it reduces the complexity and cost of the sequence detector by taking advantage of symmetry in the trellis model. However, there are drawbacks associated with a d=1 system.

Namely, in d=1 read/write channels, there is a decrease in user data rate due to the decrease in coding efficiency (rate 2/3 for EPR4/EEPR4 as compared to rate 8/9 for PR4). Thus, in order to achieve higher user data rates the channel data rate (code bit rate) must be increased using faster, more complex timing recovery and A/D circuitry (i.e., a higher bandwidth timing recover VCO and A/D converter) which is undesirable because it is not cost effective.

The above referenced patent application entitled "SUB-SAMPLED DISCRETE TIME READ CHANNEL FOR COMPUTER STORAGE SYSTEMS" discloses a read/write channel where the analog read signal is sampled substantially below the baud rate and then interpolated to generate the synchronous sample values. This allows the timing recovery and A/D circuitry to operate at the sub-sampled rate, rather than the baud rate, thereby overcoming the cost and complexity issue described above. However, in that patent application the write circuitry for writing the RLL encoded binary data to the disk is still operated at the baud rate, which is undesirable for the same reasons it is undesirable to sample the read signal at the baud rate (i.e., it increases the cost and complexity of the write circuitry).

There is, therefore, a need for a sampled amplitude read/write channel for use in computer storage systems that can operate at high user data rates and densities without increasing the cost and complexity of the write circuitry, analog-to-digital converter, timing recovery VCO or sequence detector.

SUMMARY OF THE INVENTION

A sub-baud rate write circuit is disclosed which writes RLL encoded channel data to a disk storage medium using a write clock frequency significantly below the baud rate. This allows for a higher channel data rate without increasing the cost and complexity of the write circuitry. The write circuitry operates by re-encoding the RLL encoded channel data according to a particular mapping to generate write data at the write clock rate, and then writing the write data to the disk at appropriate phase delays. The phase delays are generated by passing the write clock through an array of delay circuits. The resulting write signal is the same as if the RLL encoded data were written to the disk using a baud rate write clock. The write circuitry of the present invention is ideally suited for use in a sub-sampled read/write channel where the object is to reduce the cost and complexity by clocking the entire channel at a frequency significantly below the baud rate.

BRIEF DESCRIPTION OF THE DRAWINGS

The above and other aspects and advantages of the present invention will be better understood by reading the following detailed description of the invention in conjunction with the drawings, wherein:

FIGS. 4A–4D are timing diagrams illustrating the operation of the write circuitry of the present invention.

FIG. 5 is a table for mapping the RLL encoded channel data and for generating the appropriate phase delayed write clock for writing the mapped data to the disk.

DETAILED DESCRIPTION OF THE PREFERRED EMBODIMENT

Conventional Sampled Amplitude read/write channel

Figure 1:
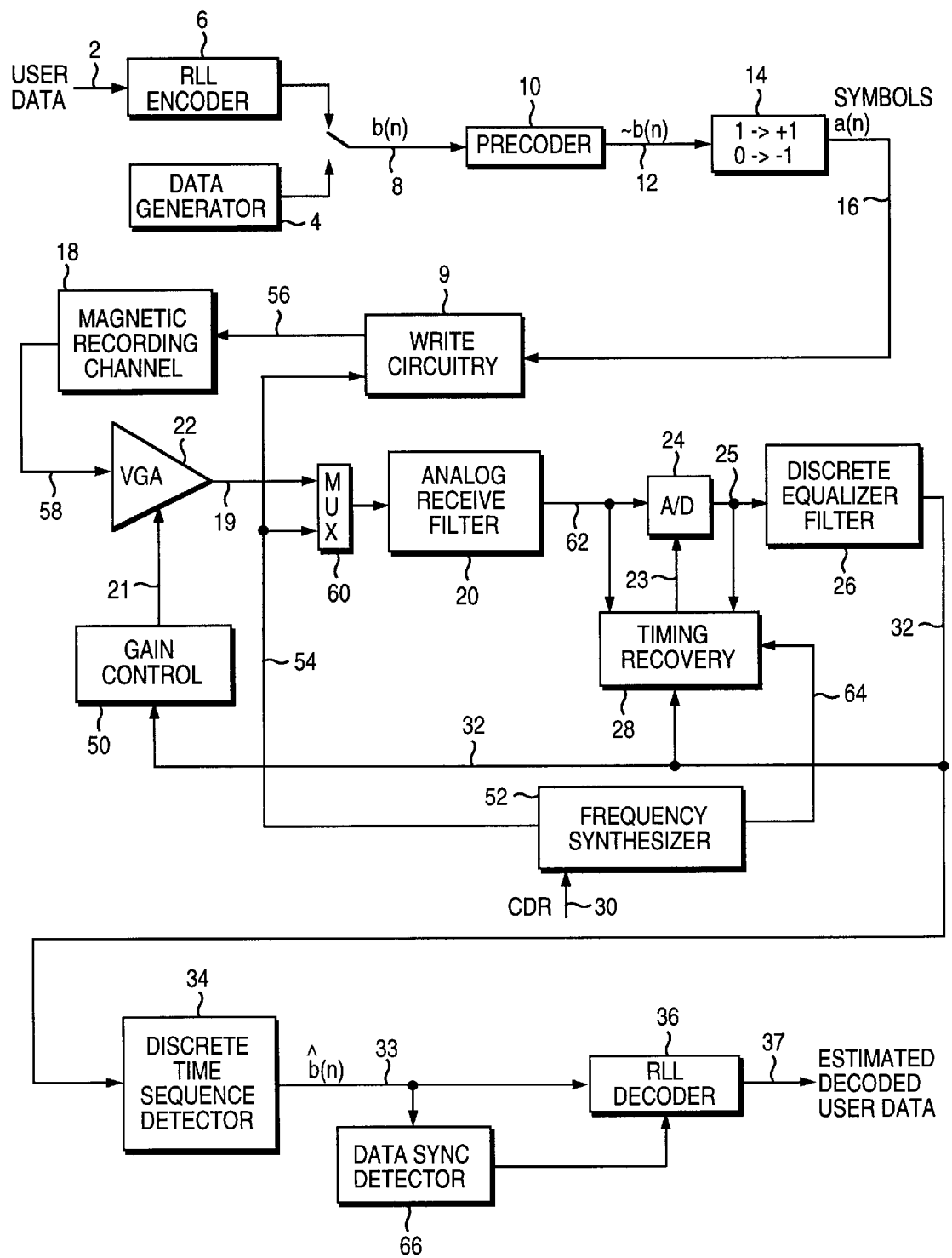
FIG. 1 is a block diagram of a conventional sampled amplitude read/write channel wherein the write circuitry writes RLL encoded data to a disk storage medium at a predetermined baud rate during a write operation, and timing recovery synchronizes the sampling of the analog read signal to the baud rate during a read operation.

Referring now to FIG. 1, shown is a detailed block diagram of a conventional sampled amplitude read/write channel. During a write operation, preamble data from a data generator 4 (for example 2T preamble data) and a sync mark 70 followed by user data 2 are written onto the storage medium. An RLL encoder 6 encodes the user data 2 into a binary sequence b(n) 8 according to an RLL constraint. A precoder 10 precodes the binary sequence b(n) 8 in order to compensate for the transfer function of the recording channel 18 and equalizing filters to form a precoded sequence ~b(n) 12. The precoded sequence ~b(n) 12 is converted into symbols a(n) 16 by translating 14 ~b(N)=0 into a(N)=−1, and ~b(N)=1 into a(N)=+1. Write circuitry 9, responsive to the symbols a(n) 16, modulates the current in the recording head coil (or intensity of a laser beam) at a predetermined baud rate 1/T for the current zone to record the binary sequence onto the disk storage medium. A frequency synthesizer 52 provides a baud rate write clock 54 to the write circuitry 9 which is adjusted by a channel data rate signal (CDR) 30 according to the zone the recording head is over ("zoned" recording is described below with reference to FIG. 2A).

When reading the recorded binary sequence from the storage medium, timing recovery 28 first locks to the write frequency by selecting, as the input to the read/write channel, the write clock through a multiplexer 60. Once locked to the write frequency, the multiplexer 60 selects the analog signal 19 from the read head as the input to the read/write channel in order to acquire an acquisition preamble recorded on the disk prior to the recorded user data. A variable gain amplifier 22 adjusts the amplitude of the analog read signal 58, and an analog filter 20 provides initial equalization toward the desired response as well as attenuating channel and aliasing noise. A sampling device 24 samples the analog read signal 62 from the analog receive filter 20, and a discrete-time equalizer filter 26 provides further equalization of the sample values 25 toward the desired response. In partial response recording, for example, the desired response is often selected from Table 1.

TABLE 1

| Channel | Transfer Function | Dipulse Response |
| --- | --- | --- |
| PR4 | $(1-D)(1+D)$ | 0, 1, 0, −1, 0, 0, 0, . . . |
| EPR4 | $(1-D)(1+D)^2$ | 0, 1, 1, −1, −1, 0, 0, . . . |
| EEPR4 | $(1-D)(1+D)^3$ | 0, 1, 2, 0, −2, −1, 0, . . . |

After equalization, the equalized sample values 32 are applied to a decision directed gain control 50 and timing recovery 28 circuit for adjusting the amplitude of the read signal 58 and the frequency and phase of the sampling device 24, respectively. Timing recovery adjusts the frequency of sampling device 24 over line 23 in order to synchronize the equalized samples 32 to the baud rate. Frequency synthesizer 52 provides a course center frequency setting to the timing recovery circuit 28 over line 64 in order to center the frequency of a variable frequency oscillator (VFO) over temperature, voltage, and process variations. The channel data rate (CDR) signal 30 adjusts a frequency range of the synthesizer 52 according to the data rate for the current zone. Gain control 50 adjusts the gain of variable gain amplifier 22 over line 21 in order to match the magnitude of the channel's frequency response to the desired partial response.

The equalized samples Y(n) 32 are ultimately processed by a discrete-time sequence detector 34, such as a maximum likelihood (ML) Viterbi sequence detector, which detects an estimated binary sequence ^b(n) 33 from the sample values. An RLL decoder 36 decodes the estimated binary sequence ^b(n) 33 output by the sequence detector 34 into estimated user data 37. A data sync detector 66 detects a sync mark 70 in the data sector 15 (shown in FIG. 2B described below) in order to frame operation of the RLL decoder 36. In the absence of errors, the estimated binary sequence ^b(n) 33 will match the recorded binary sequence b(n) 8, and the decoded user data 37 will match the recorded user data 2.

Data Format

Figure 2A:
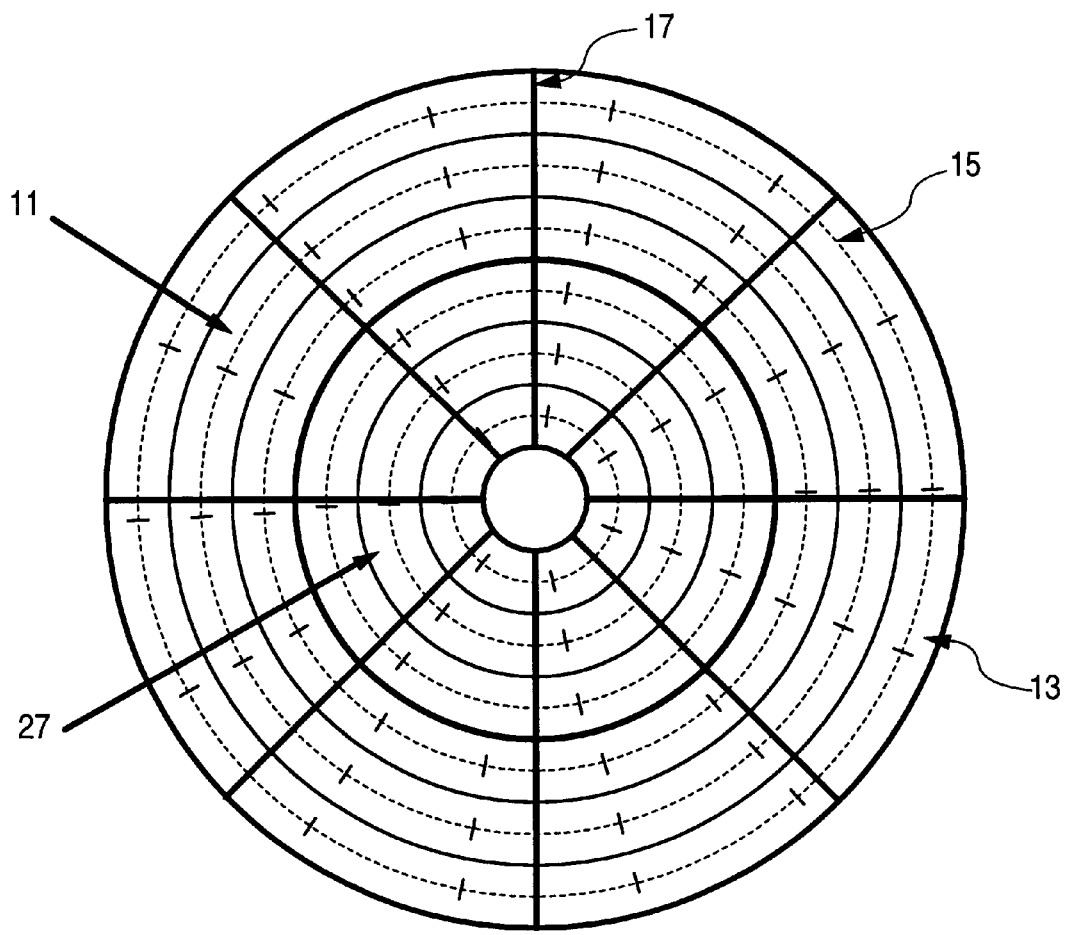
FIG. 2A shows an exemplary data format of a magnetic disk having a plurality of concentric tracks comprised of a plurality of user data sectors and embedded servo data sectors.

FIG. 2A shows an exemplary data format of a magnetic disk storage medium comprising a series of concentric data tracks 13 wherein each data track 13 comprises a plurality of sectors 15 with embedded servo wedges 17. A servo controller (not shown) processes the servo data in the servo wedges 17 and, in response thereto, positions the read/write head over a desired track. Additionally, the servo controller processes servo bursts within the servo wedges 17 to keep the head aligned over a centerline of the desired track while writing and reading data. The digital information within the servo wedges 17 may be detected by a simple discrete-time pulse detector or by the discrete-time sequence detector 34.

Figure 2B:
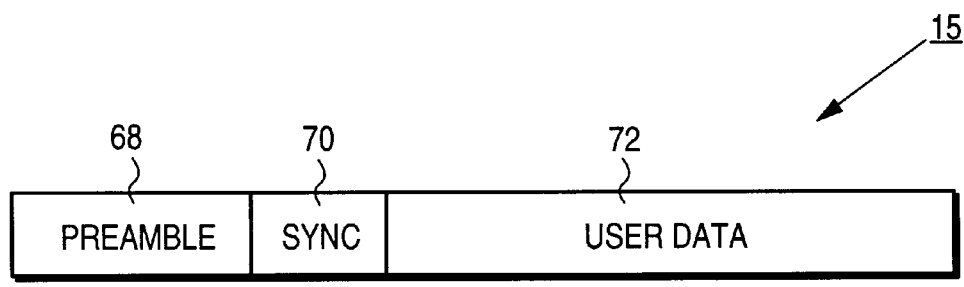
FIG. 2B shows an exemplary format of a user data sector.

FIG. 2B shows the format of a data sector 15 comprising an acquisition preamble 68, a sync mark 70, and user data 72. Timing recovery processes the acquisition preamble 68 to acquire the correct sampling frequency and phase before reading the user data 72, and the sync mark 70 signals the beginning of the user data 72 for symbol-synchronizing the RLL decoder 36.

To increase the overall storage density, the disk is partitioned into an outer zone 11 comprising fourteen data sectors per track, and an inner zone 27 comprising seven data sectors per track. In practice, the disk is actually partitioned into several zones with a different number of sectors in each zone, and the data recorded and detected at a different data rate in each zone. This technique, referred to as "zoned" recording, is made possible due to the decrease in intersymbol interference at the outer diameter tracks.

Sub-sampled Read/Write Channel With Sub-Baud Rate Write Circuit

Figure 3:
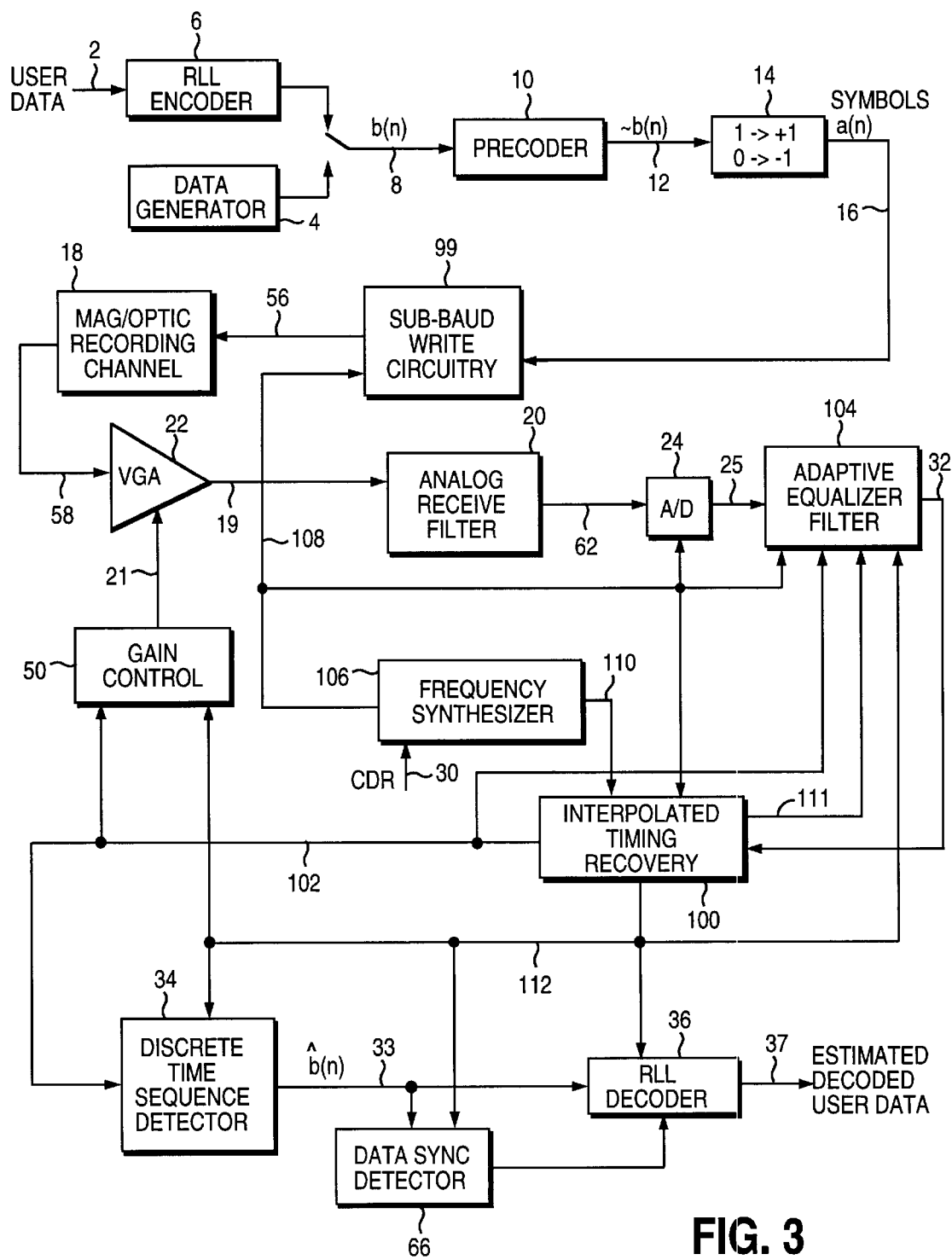
FIG. 3 is a block diagram of the improved sampled amplitude read/write channel of the present invention comprising a sub-baud rate write circuit and interpolated timing recovery circuit.

FIG. 3 shows the sub-sampled read/write channel of the present invention comprising a sub-baud rate write clock 108 and interpolated timing recovery (ITR) 100. In contrast to the prior art read/write channel of FIG. 1, which writes the RLL encoded data symbols a(n) 16 to the disk storage medium at the baud rate, the write circuitry 99 of the present invention re-encodes the RLL data according to a particular mapping and then writes the re-encoded data to the disk storage medium at particular phase delays using a sub-baud rate write clock. In effect, the same amount of information is written to the disk as in the prior art read/write channel without clocking the write circuitry at the baud rate. This reduces the cost and complexity of the write circuitry significantly, particularly when the entire read/write channel is designed to operate at a lower clocking frequency in order to increase the throughput of the channel. Such is the case in the sub-sampled read/write channel of FIG. 3.

The sampling device 24 in FIG. 3 samples the analog read signal 62 at a rate significantly below the baud rate (for example, 10% below Nyquist) rather than synchronously sampling at the baud rate as in the prior art read/write channel shown in FIG. 1. The conventional synchronous-sampling timing recovery 28 of FIG. 1 is replaced with the interpolated timing recovery 100 which interpolates the asynchronous sample values 32 and generates interpolated sample values 102 substantially synchronized to the baud rate. A frequency synthesizer 106 generates the sub-baud rate write clock 108 applied to the write circuitry 99 during a write operation, and a sub-baud rate, asynchronous sampling clock 108 for clocking the sampling device 24, the discrete-time adaptive equalizer 104, and the ITR 100 during a read operation. The frequency synthesizer 106 also generates a Nyquist clock 110 at a frequency slightly above the baud rate for use in generating the interpolated sample values 102 as described in more detail below with reference to FIG. 8B. In an alternative embodiment, a first frequency synthesizer generates the write clock, and a second frequency synthesizer generates the read clock.

The cutoff frequency of the analog receive filter 20 is reduced, thereby bandlimiting the spectrum of the read signal to attenuate the undesirable effect of aliasing. The discrete equalizer 104 is real-time adaptive, receiving interpolated sample values 102 and estimated sample values 111 from the ITR 100 for use in a least mean square (LMS) adaptive algorithm. The discrete-time adaptive equalizer 104 comprises an error filter for filtering the error signal used in the adaptation algorithm to remove the component corresponding to the cutoff part of the read signal spectrum. Further details concerning the adaptive equalizer 104, including the error filter, are provided in the above referenced U.S. patent application entitled "ADAPTIVE EQUALIZATION IN A SUB-SAMPLED READ CHANNEL FOR DISK STORAGE SYSTEMS." Ultimately, a discrete-time sequence detector 34 detects an estimated binary sequence 33 representing the user data from the interpolated sample values 102.

To avoid clocking the circuitry downstream from the ITR 100 at the baud rate, the adaptive equalizer 104, gain control 50 and sequence detector 34 are preferably designed to processes multiple interpolated sample values 102 in parallel. In other words, the ITR 100 is configured to buffer the interpolated sample values 102 which are then output n at a time (e.g., two samples at a time). The ITR 100 also generates a data clock 112 for clocking operation of the downstream circuitry at the output frequency of the interpolated sample values 102. This aspect of ITR 100 is described in more detail below with reference to FIG. 11.

Sub-Baud Rate Write Circuit

Operation of the sub-baud rate write circuit 99 of FIG. 3 is understood with reference to the timing diagrams of FIGS. 4A–4D. In these diagrams, the user data is encoded according to a d=1 RLL constraint with a code rate of 2/3, and the write clock 108 is generated by the frequency synthesizer 52 at 2/3 the frequency of the baud rate (i.e., at the user data rate). As described above, the d=1 RLL constraint limits the minimum spacing between consecutive magnetic transitions to at least two bit cells. In other words, the user data 2 are encoded such that at least one NRZI "0" bit occurs between consecutive "1" bits. The present invention exploits this code constraint in writing the RLL encoded data to the disk storage medium at the baud rate using a sub-baud rate write clock. The RLL d=1 encoded data is re-encoded according to a particular mapping, and then each bit of the mapped data is written to the disk at a predetermined phase delay. The desired phase delay is generated by passing the sub-baud rate write clock through an array of delays, and then selecting the output of the appropriate delay. The effect is to write the original RLL d=1 encoded data to the disk at n-bits per second using a write clock cycling at m-cycles per second, where m<n.

The timing diagram of FIG. 4A shows an example RLL encoded NRZI sequence output by the RLL encoder 6 of FIG. 3. The square wave represents the write current where in NRZI encoding a "1" bit is written as a magnetic transition and a "0" bit is written as no magnetic transition. Notice that the d=1 constraint ensures that at least one "0" bit occurs between consecutive "1" bits. FIG. 4B shows a write clock cycling at 2/3 the baud rate (i.e., at the uncoded user data rate) relative to the baud rate data of FIG. 4A. Notice that every other write clock period can overlap one of two d=1 RLL transitions while the other write clock period can only contain one RLL transition, and that there is always at most one transition per write clock period.

Thus, it is possible to re-encode the RLL data at rate 3/2 (i.e., map 3 bits of RLL data into 2 bits of mapped data) and then to write the mapped data to the disk at the RLL data rate by appropriately adjusting the phase delay of the write clock. In other words, it is possible to map 3 bits of RLL data into 2 write clock periods, thereby writing the RLL data to the disk using a sub-baud rate write clock. The mapping and corresponding phase delay of the write clock is understood with reference to the table shown in FIG. 5. The first row shows the five possible variations for 3 consecutive bits of d=1 RLL encoded channel data (in NRZI), and the second row shows the corresponding mapped data (in NRZI). Notice that the first mapped data bit is just the logical OR of the first two RLL data bits, and that the second mapped data bit is simply the third RLL data bit. The third row of FIG. 5 represents the phase delay for the write clock when writing each bit of the mapped data to the disk; the delays are also determined from a simple mapping of the RLL NRZI data.

Figure 6A:
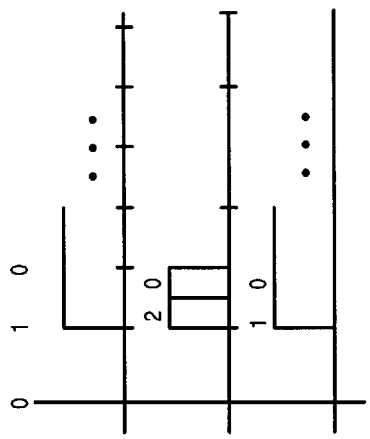
FIGS. 6A–6D illustrate the RLL NRZI mapping and corresponding phase delayed write clock for writing the mapped data to the disk.
Figure 6B:
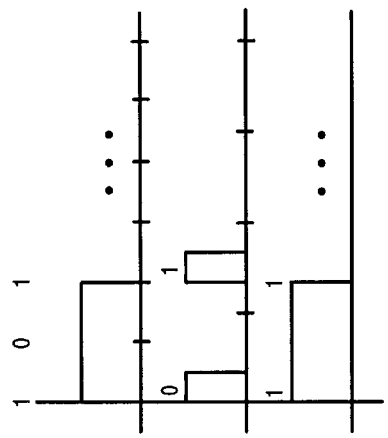
Figure 6C:
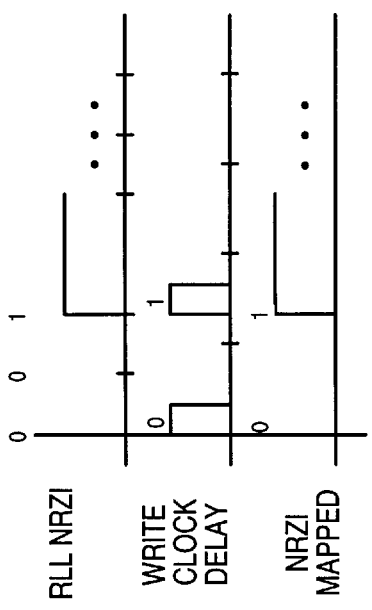
Figure 6D:
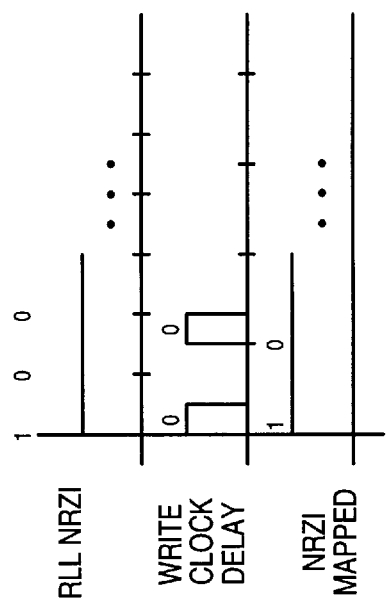

Mapping the RLL NRZI data bits and delaying the write clock is illustrated in FIG. 6A through FIG. 6D. For example, FIG. 6A shows the mapping of RLL NRZI data "001" into the mapped NRZI data of "01", and the corresponding delay of "0" for the first write clock (i.e., no delay) and "1" for the second write clock (i.e., a delay of 1/3 period). FIG. 4C and FIG. 4D illustrate the result of mapping the example RLL NRZI data sequence shown in FIG. 4A. Notice that the square waves representing the write current in FIG. 4A and FIG. 4D are identical. Consequently, writing the NRZI mapped data to the disk with the sub-baud rate write clock effectively writes the RLL NRZI data to the disk at the baud rate.

Figure 7:
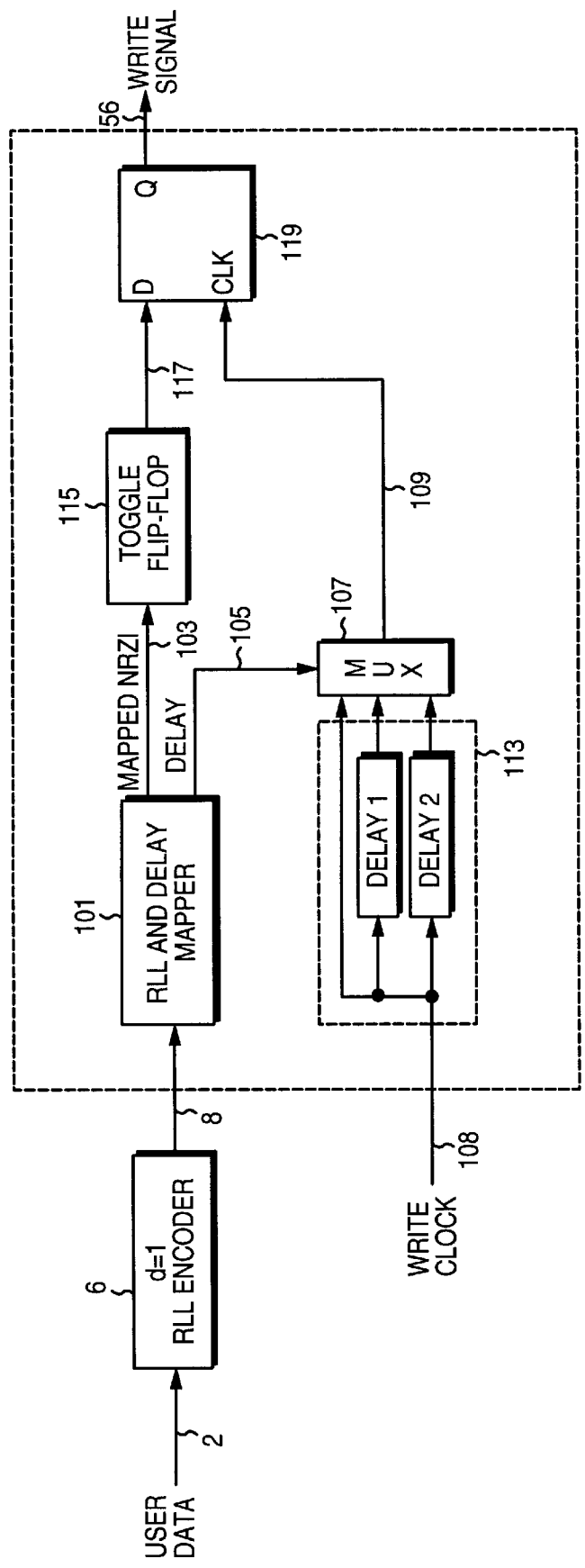
FIG. 7 shows details of the write circuitry of the present invention.

Details of the write circuit 99 of FIG. 3 are shown in FIG. 7. The d=1 RLL encoded user data 8 output by the RLL encoder 6 are input into an RLL and delay mapper 101 which outputs mapped NRZI data bits 103 and the appropriate delay 105 according to the table of FIG. 5. The write clock 108 generated by the frequency synthesizer 106 is input into an array of delay circuits 113, and the delay 105 output by the delay mapper 101 selects the appropriate phase delayed versions of the write clock 108 at the output 109 of multiplexer 107. Each "1" bit in the mapped NRZI data 103 toggles the output of a toggle flip-flop 115 to generate a square wave write signal 117. The square wave write signal 117 is then clocked through a D register 119 using the phase delayed write clock 109 to generate the write signal 56 recorded to the disk.

Conventional Timing Recovery

Figure 8A:
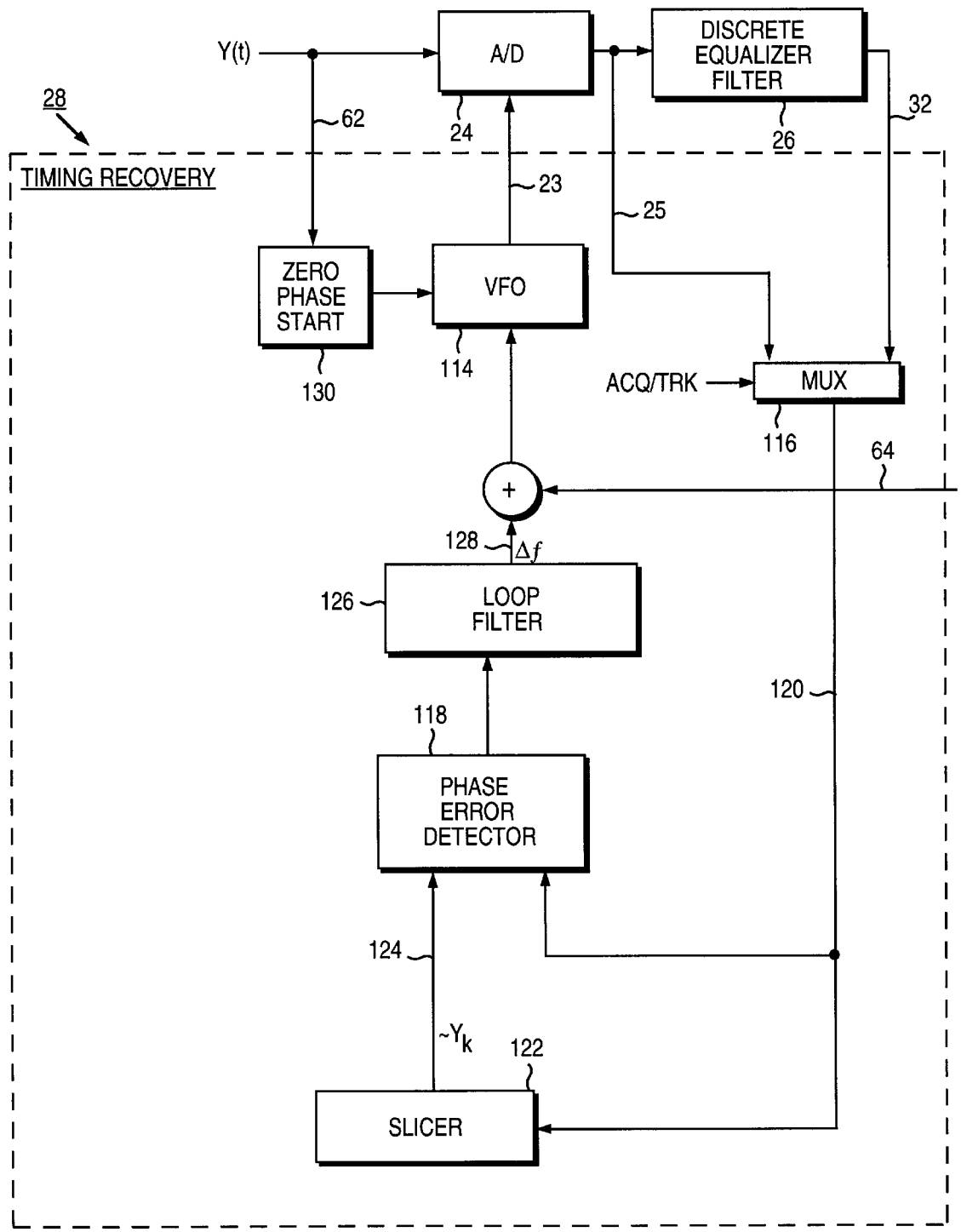
FIG. 8A is a detailed block diagram of the prior art sampling timing recovery comprising a synchronized sampling VFO.

An overview of the conventional synchronous-sampling timing recovery 28 of FIG. 1 is shown in FIG. 8A. The output 23 of a variable frequency oscillator (VFO) 114 controls the sampling clock of a sampling device 24 which is typically an analog-to-digital converter (A/D) in digital read/write channels. A multiplexer 116 selects the unequalized sample values 25 during acquisition and the equalized sample values 32 during tracking, thereby removing the discrete equalizer 26 from the timing loop during acquisition in order to avoid its associated latency. A phase error detector 118 generates a phase error in response to the sample values received over line 120 and estimated sample values $\sim Y_k$ from a sample value estimator 122, such as a slicer in a d=0 PR4 read/write channel, over line 124. A loop filter 126 filters the phase error to generate a frequency offset $\Delta f$ 128 that settles to a value proportional to a frequency difference between the sampling clock 23 and the baud rate. The frequency offset $\Delta f$ 128, together with the center frequency control signal 64 from the frequency synthesizer 52, adjust the sampling clock 23 at the output of the VFO 114 in order to synchronize the sampling to the baud rate.

A zero phase start 130 circuit suspends operation of the VFO 114 at the beginning of acquisition in order to minimize the initial phase error between the sampling clock 23 and the read signal 62. This is achieved by disabling the VFO 114, detecting a zero crossing in the analog read signal 62, and re-enabling the VFO 114 after a predetermined delay between the detected zero crossing and the first baud rate sample.

Interpolated Timing Recovery

Figure 8B:
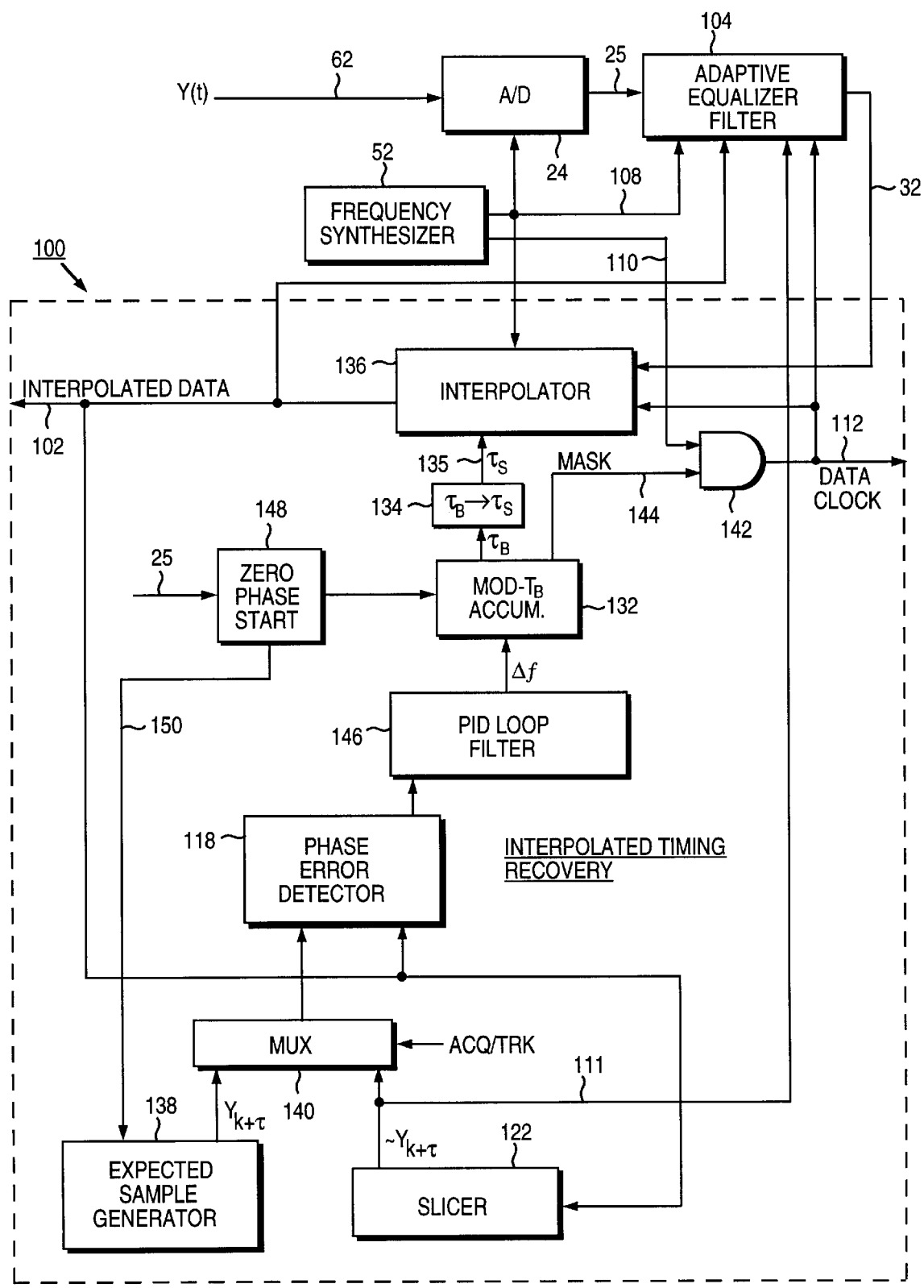
FIG. 8B is a detailed block diagram of the interpolating timing recovery of the present invention comprising asynchronous sub-sampling and an interpolator for generating interpolated sample values substantially synchronized to the baud rate.

The interpolated timing recovery (ITR) 100 employed in a sub-sampled read/write channel is shown in FIG. 8B. The VFO 114 in the it conventional timing recovery of FIG. 8A is replaced with a modulo-$T_B$ accumulator 132, a baud-to-sample rate converter $\tau_B \rightarrow \tau_S$ 134, and an interpolator 136. In addition, an expected sample value generator 138 generates expected samples $Y_{k+\tau}$ used by the phase error detector 118 to compute the phase error during acquisition. A multiplexer 140 selects the estimated sample values $\sim Y_{k+\tau}$ from the slicer 122 for use by the phase error detector 118 during tracking. The phase error detector 118 and the slicer 122 process interpolated sample values 102 at the output of the interpolator 136 rather than the channel sample values 32 at the output of the discrete equalizer 26 as in FIG. 8A. A PID loop filter 146 controls the closed loop frequency response similar to the loop filter 126 of FIG. 8A. The interpolated sample values 102 and the estimated sample values $\sim Y_{k+\tau}$ 111 from the slicer 122 are input into the adaptive equalizer 104 of FIG. 3 to adaptively tune the equalizer 104 in real time according to a least mean square (LMS) algorithm.

The interpolator 136 outputs multiple synchronous samples which are processed in parallel so that the down stream components can be clocked at significantly below the baud rate. This aspect of the present invention is described below with reference to FIG. 11 which shows an implementation of the interpolator 136 outputting two synchronous samples at a time. A data clock 112 is generated at the output of an AND gate 142 in response to the Nyquist clock 110 generated by frequency synthesizer 52 and a mask signal 144 generated by the modulo-$T_B$ accumulator 132. Further details concerning the Nyquist clock 110 and the mask signal 144 are provided below with reference to FIG. 9. The data clock 112 is used to clock the components down stream from the interpolator 136 (as well as for clocking the interpolator 136).

In the ITR 100 of the present invention, locking a VFO to a reference frequency before acquiring the preamble is no longer necessary; multiplexing 60 the write clock 54 into the analog receive filter 20 (as in FIG. 1) is not necessary. Further, the sampling device 24 and the discrete equalizer 26, together with their associated delays, have been removed from the timing recovery loop; it is not necessary to multiplex 116 around the discrete equalizer 26 between acquisition and tracking as in FIG. 8A. However, it is still necessary to acquire a preamble 68 before tracking the user data 72. To this end, a zero phase start (ZPR) circuit 148 minimizes the initial phase error between the interpolated sample values and the baud rate at the beginning of acquisition similar to the ZPR circuit 130 of FIG. 8A. However, rather than suspend operation of a sampling VFO 114, the ZPR circuit 148 for ITR 100 computes an initial phase error $\tau_B$ from the A/D 24 sample values 25 and loads this initial phase error into the modulo-$T_B$ accumulator 132. The ZPR circuit 148 also generates a control signal over line 150 for initializing the expected sample generator 138 before beginning acquisition.

Interpolator

Figure 9:
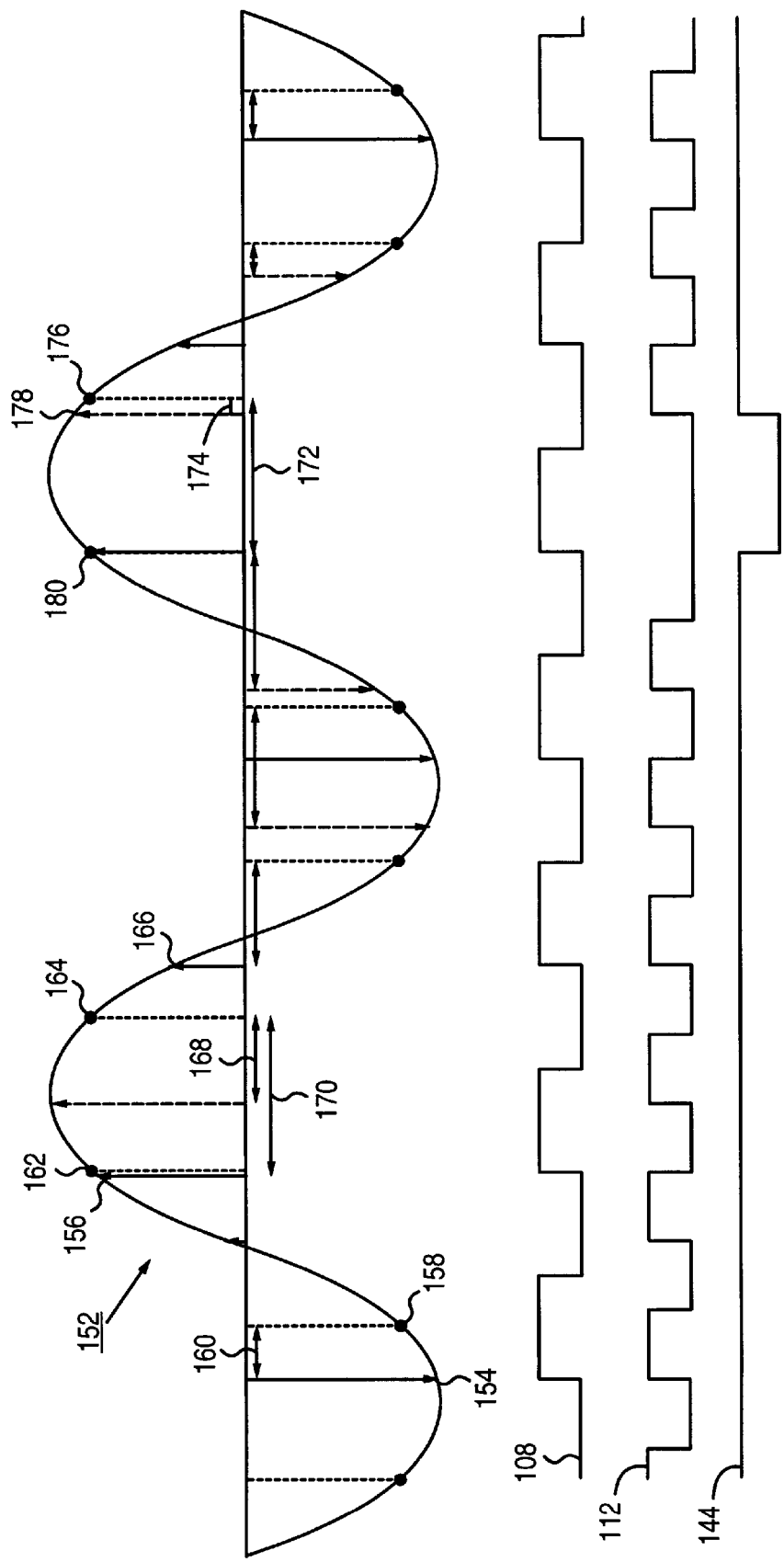
FIG. 9 illustrates the sub-baud rate channel samples in relation to the interpolated baud rate samples when reading the acquisition preamble.

The interpolator 136 of FIG. 8B is understood with reference to FIG. 9 which shows a sampled 2T acquisition preamble signal 152. In this example, the read signal is sampled at a rate slightly above 2/3 the baud rate. Thus, the frequency synthesizer 52 generates the asynchronous sampling clock 108 at a frequency slightly above 2/3 the baud rate, and the Nyquist clock 110 at a frequency slightly above the baud rate. This is accomplished by dividing a base frequency by 2 and 3 to generate the Nyquist clock 110 and asynchronous sampling clock 108, respectively. A data clock 112 synchronized to the baud rate on average is generated by masking appropriate cycles of the Nyquist clock 110 through AND gate 142 using a MASK signal 144 generated by the MOD-$T_B$ accumulator 132.

In FIG. 9, the target synchronous sample values 102 are shown as black circles, the asynchronous channel sample values 32 are shown as vertical arrows with solid lines, and the Nyquist clock intervals 110 shown as vertical arrows with dashed lines. Beneath the sampled preamble signal 152 is a timing diagram depicting the corresponding timing signals for the asynchronous sampling clock 108, the data clock 112, and the mask signal 144.

The function of the interpolator is to estimate the target sample values by interpolating the channel sample values. For illustrative purposes, consider a simple estimation algorithm, linear interpolation:

$$Y(N-1) = x(N-1) + \tau_S \cdot (x(N) - x(N-1)) \tag{1}$$

where $x(N-1)$ and $x(N)$ are the channel samples surrounding the target sample, and $\tau_S$ is a sampling rate interpolation interval proportional to a time difference between the channel sample value $x(N-1)$ and the target sample value. The sample rate interpolation interval $\tau_S$ is generated by converting a baud rate interpolation interval $\tau_B$ at baud-to-sample rate converter $\tau_B \rightarrow \tau_S$ 134 of FIG. 8B. The baud rate interpolation interval $\tau_B$ is generated at the output of the modulo-$T_B$ accumulator 132 which accumulates the frequency offset signal $\Delta f$ at the output of the PID loop filter 146:

$$\tau_B = (\Sigma \Delta f) MOD T_B \tag{2}$$

where $T_B$ is the Nyquest rate (slightly above the baud rate). Operation of the modulo-$T_B$ accumulator 132 and the baud-to-sample rate converter 134 is understood with reference to the timing diagram of FIG. 9.

Assuming the interpolator 136 implements the simple linear equation (1) above, then channel sample values 154 and 156 are used to generate the interpolated sample value corresponding to target sample value 158. The baud rate interpolation interval $\tau_B$ is generated according to equation (2) above, and the sample rate interpolation interval $\tau_S$ 160 is computed as 2/3 the baud rate interpolation interval $\tau_B$ because the phase offset between the sampling clock 108 and the Nyquist interval 121 is zero (i.e., the baud-to-sample rate converter 134 simply multiplies the baud rate interval $\tau_B$ by 2/3 to generate the sample rate interval $\tau_S$ 160). The next two interpolated sample values corresponding to the next two target values 162 and 164 are computed from channel sample values 156 and 166. To generate the second interpolated sample 164, the baud rate interpolation interval $\tau_B$ 168 is computed according to equation (2) above. The baud rate interpolation interval $\tau_B$ 168 is then converted to a sample rate interpolation interval $\tau_S$ 170 by multiplying the baud rate interpolation interval $\tau_B$ 168 by 2/3 and adding the phase offset between the sampling clock 108 and the Nyquist clock 110.

This process continues where the interpolator generates the synchronous sample values at the rate of . . . 2,1,2,1,2, 1,2,1 . . . per sample clock period until the baud rate interpolation interval $\tau_B$ 172 would be greater than $T_B$ except that it "wraps" around and is actually $\tau_B$ 174 (i.e., the accumulated frequency offset $\Delta f$, integer divided by $T_B$, increments by 1). At this point, the Nyquist clock 110 is masked by MASK signal 144 so that the interpolated sample value corresponding to the target sample value 176 is computed at Nyquist clock interval 178 rather than at Nyquist clock interval 180. The interpolator 136 outputs a single synchronous sample value corresponding to target sample 176 rather than two synchronous sample values, that is, the output sequence is decimated to . . . 2,1,2,1,2,1,2, 1,2,1 . . . . This periodic decimation in the output rate is due to oversampling the read signal at slightly above 2/3 the baud rate. Thus, the data clock 112 for clocking the down stream components is generated at the output rate of the interpolator 136, taking into account the condition where the interpolation interval $\tau_B$ wraps and the output rate changes accordingly.

The simple linear interpolation of equation (1) above will only work if the analog read signal is sampled at a much higher frequency than the baud rate. This is not desirable since operating the channel at higher frequencies increases its complexity and cost. Therefore, in the preferred embodiment the interpolator 136 is implemented as an FIR filter responsive to more than two channel samples to compute the interpolated sample value.

The ideal discrete-time phase interpolation FIR filter has a flat magnitude response and a constant group delay of $\tau$:

$$C_\tau(e^{j\omega}) = e^{j\omega\tau} \tag{3}$$

which has an ideal impulse response:

$$\sin c(\pi \cdot (n - \tau/T)). \tag{4}$$

Unfortunately, the above non-causal infinite impulse response (4) cannot be realized. Therefore, the impulse response of the interpolation filter is designed to be a best fit approximation of the ideal impulse response (4). This can be accomplished by minimizing a mean squared error between the frequency response of the actual interpolation filter and the frequency response of the ideal interpolation filter (3). This approximation can be improved by taking into account the spectrum of the input signal, that is, by minimizing the mean squared error between the input spectrum multiplied by the actual interpolation spectrum and the input spectrum multiplied by the ideal interpolation spectrum:

$$\overline{C}_\tau(e^{j\omega})X(e^{j\omega}) - C_\tau(e^{j\omega})X(e^{j\omega}) \tag{5}$$

where $\overline{C}_\tau(e^{j\omega})$ is the spectrum of the actual interpolation filter; and $X(e^{j\omega})$ is the spectrum of the input signal. From equation (5), the mean squared error is represented by:

$$E_\tau^2 = \frac{1}{2\pi} \int_{-\pi}^{\pi} |\overline{C}_\tau(e^{j\omega}) - e^{j\omega\tau}|^2 |X(e^{j\omega})|^2 \, d\omega \tag{6}$$

where $X(e^{j\omega})$ is the spectrum of the read/write channel (e.g., PR4, EPR4, EEPR of Table 1 or some other partial response spectrum).

In practice, the above mean squared error equation (6) is modified by specifying that the spectrum of the input signal is bandlimited to some predetermined constant $0 \leq \omega \leq \alpha\pi$ as where $0 < \alpha < 1$; that is:

$$|X(e^{j\omega})| = 0, \text{ for } |\omega| \geq \alpha\pi.$$

Then equation (6) can be expressed as:

$$E_{\tau,\alpha}^2 = \frac{1}{2\pi}\int_{-\alpha\pi}^{\alpha\pi}|\overline{C}_\tau(e^{j\omega}) - e^{j\omega\tau}|^2|X(e^{j\omega})|^2\,d\omega. \quad (7)$$

The solution to the minimization problem of equation (7) involves expressing the actual interpolation filter in terms of its coefficients and then solving for the coefficients that minimize the error in a classical mean-squared sense.

The actual interpolation filter can be expressed as the FIR polynomial:

$$\overline{C}_\tau(e^{j\omega}) = \sum_{n=-R}^{n=R-1} C_\tau(n)e^{-j\omega n} \quad (8)$$

where 2R is the number of taps in each interpolation filter and the sample period Ts has been normalized to 1. A mathematical derivation for an interpolation filter having an even number of coefficients is provided below. It is within the ability of those skilled in the art to modify the mathematics to derive an interpolation filter having an odd number of coefficients.

Substituting equation (8) into equation (7) leads to the desired expression in terms of the coefficients $C_\tau(n)$:

$$E_{\tau,\alpha}^2 = \frac{1}{2\pi}\int_{-\alpha\pi}^{\alpha\pi}\left|\sum_{n=-R}^{n=R-1} C_\tau(n)e^{-j\omega n} - e^{j\omega\tau}\right|^2|X(e^{j\omega})|^2\,d\omega. \quad (9)$$

The next step is to take the derivatives of equation (9) with respect to the coefficients $C_\tau(n)$ and set them to zero:

$$\frac{\partial E_{\tau,\alpha}^2}{\partial c_\tau(n_o)} = 0 \text{ for } n_o = -R, \ldots, 0, 1, \ldots, R-1. \quad (10)$$

After careful manipulation, equation (10) leads to:

$$\int_{-\alpha\pi}^{\alpha\pi}\left[\left(\sum_{n=-R}^{n=R-1} C_\tau(n)\cos(\omega(n_o - n))\right) - \cos(\omega(n_o + \tau))\right]|X(e^{j\omega})|^2\,d\omega = 0 \quad (11)$$

$$\text{for } n_o = -R, \ldots, 0, 1, \ldots, R-1.$$

Defining $\phi(r)$ as:

$$\phi(r) = \int_{-\alpha\pi}^{\alpha\pi}|X(e^{j\omega})|^2\cos(\omega r)\,d\omega \quad (12)$$

and substituting equation (12) into equation (11) gives:

$$\sum_{n=-R}^{n=R-1} C_\tau(n)\phi(n - n_o) = \phi(n_o + \tau) \quad (13)$$

$$\text{for } n_o = -R, \ldots, 0, 1, \ldots, R-1.$$

Equation (13) defines a set of 2R linear equations in terms of the coefficients $C_\tau(n)$. Equation (13) can be expressed more compactly in matrix form:

$$\Phi_T C_\tau = \Phi_\tau$$

where $C_\tau$ is a column vector of the form:

$$C_\tau = [c_\tau(-R), \ldots, c_\tau(0), \ldots, c_\tau(R-1)]^t$$

$\Phi_T$ is a Toeplitz matrix of the form:

$$\Phi_T = \begin{bmatrix} \phi(0) & \phi(1) & \cdots & \phi(2R-1) \\ \phi(1) & \phi(0) & & \\ \vdots & & & \vdots \\ \phi(2R-1) & & \cdots & \phi(0) \end{bmatrix}$$

and $\Phi_\tau$ is a column vector of the form:

$$\Phi_\tau = [\phi(-R+\tau), \ldots, \phi(\tau), \phi(1+\tau), \ldots, \phi(R-1+\tau)]^t. \quad (14)$$

The solution to equation (14) is:

$$C_\tau = \Phi_T^{-1}\Phi_\tau \quad (15)$$

where $\Phi_T^{-1}$ is an inverse matrix that can be solved using well known methods.

TABLE 2

| $\tau_s \cdot 32/T_s$ | C(−2) | C(−1) | C(0) | C(1) | C(2) | C(3) |
|---|---|---|---|---|---|---|
| 0 | 0.0000 | −0.0000 | 1.0000 | 0.0000 | −0.0000 | 0.0000 |
| 1 | 0.0090 | −0.0231 | 0.9965 | 0.0337 | −0.0120 | 0.0068 |
| 2 | 0.0176 | −0.0445 | 0.9901 | 0.0690 | −0.0241 | 0.0135 |
| 3 | 0.0258 | −0.0641 | 0.9808 | 0.1058 | −0.0364 | 0.0202 |
| 4 | 0.0335 | −0.0819 | 0.9686 | 0.1438 | −0.0487 | 0.0268 |
| 5 | 0.0407 | −0.0979 | 0.9536 | 0.1829 | −0.0608 | 0.0331 |
| 6 | 0.0473 | −0.1120 | 0.9359 | 0.2230 | −0.0728 | 0.0393 |
| 7 | 0.0533 | −0.1243 | 0.9155 | 0.2638 | −0.0844 | 0.0451 |
| 8 | 0.0587 | −0.1348 | 0.8926 | 0.3052 | −0.0957 | 0.0506 |
| 9 | 0.0634 | −0.1434 | 0.8674 | 0.3471 | −0.1063 | 0.0556 |
| 10 | 0.0674 | −0.1503 | 0.8398 | 0.3891 | −0.1164 | 0.0603 |
| 11 | 0.0707 | −0.1555 | 0.8101 | 0.4311 | −0.1257 | 0.0644 |
| 12 | 0.0732 | −0.1589 | 0.7784 | 0.4730 | −0.1341 | 0.0680 |
| 13 | 0.0751 | −0.1608 | 0.7448 | 0.5145 | −0.1415 | 0.0710 |
| 14 | 0.0761 | −0.1611 | 0.7096 | 0.5554 | −0.1480 | 0.0734 |
| 15 | 0.0765 | −0.1598 | 0.6728 | 0.5956 | −0.1532 | 0.0751 |
| 16 | 0.0761 | −0.1572 | 0.6348 | 0.6348 | −0.1572 | 0.0761 |
| 17 | 0.0751 | −0.1532 | 0.5956 | 0.6728 | −0.1598 | 0.0765 |
| 18 | 0.0734 | −0.1480 | 0.5554 | 0.7096 | −0.1611 | 0.0761 |
| 19 | 0.0710 | −0.1415 | 0.5145 | 0.7448 | −0.1608 | 0.0751 |
| 20 | 0.0680 | −0.1341 | 0.4730 | 0.7784 | −0.1589 | 0.0732 |
| 21 | 0.0644 | −0.1257 | 0.4311 | 0.8101 | −0.1555 | 0.0707 |
| 22 | 0.0603 | −0.1164 | 0.3891 | 0.8398 | −0.1503 | 0.0674 |
| 23 | 0.0556 | −0.1063 | 0.3471 | 0.8674 | −0.1434 | 0.0634 |
| 24 | 0.0506 | −0.0957 | 0.3052 | 0.8926 | −0.1348 | 0.0587 |
| 25 | 0.0451 | −0.0844 | 0.2638 | 0.9155 | −0.1243 | 0.0533 |
| 26 | 0.0393 | −0.0728 | 0.2230 | 0.9359 | −0.1120 | 0.0473 |
| 27 | 0.0331 | −0.0608 | 0.1829 | 0.9536 | −0.0979 | 0.0407 |
| 28 | 0.0268 | −0.0487 | 0.1438 | 0.9686 | −0.0819 | 0.0335 |
| 29 | 0.0202 | −0.0364 | 0.1058 | 0.9808 | −0.0641 | 0.0258 |
| 30 | 0.0135 | −0.0241 | 0.0690 | 0.9901 | −0.0445 | 0.0176 |
| 31 | 0.0068 | −0.0120 | 0.0337 | 0.9965 | −0.0231 | 0.0090 |

Figure 10:
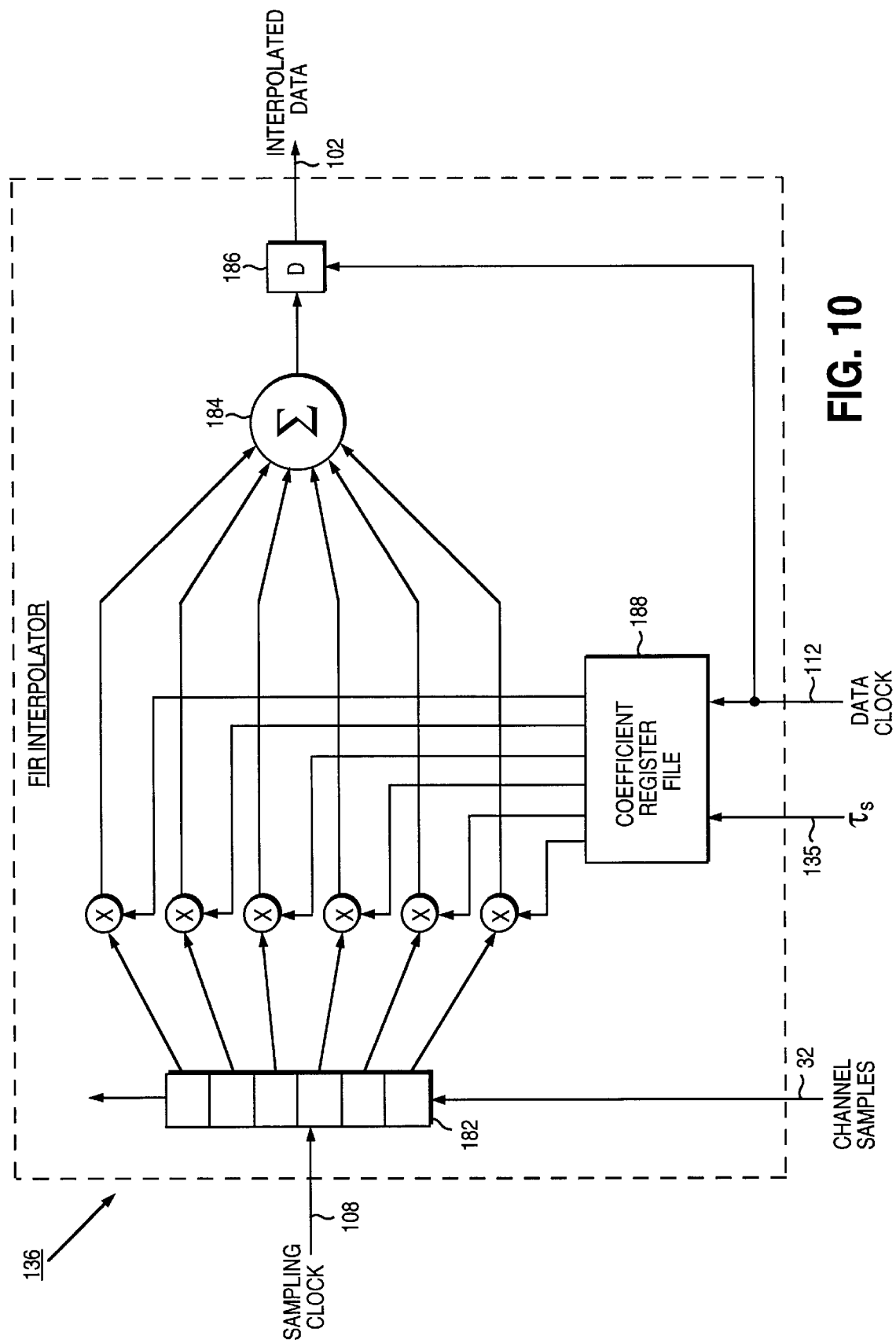
FIG. 10 shows an FIR filter implementation for the timing recovery interpolator.

Table 2 above shows example coefficients $C_\tau(n)$ calculated from equation (15) with 2R=6, α=0.8 and $X(e^{j\omega})$=PR4 where $T_s$ is the period of the sampling clock 108. The implementation of the six tap FIR filter is shown in FIG. 10. A shift register 182 receives the channel samples 32 at the sampling clock rate 108. The filter coefficients $C_\tau(n)$ are stored in a coefficient register file 188 and applied to corresponding multipliers according to the current value of $\tau_S$ 135 (i.e., the interpolator 136 is a time varying FIR filter). The coefficients are multiplied by the channel samples 32 stored in the shift register 182. The resulting products are summed 184 and the sum stored in a delay register 186. The coefficient register file 188 and the delay register 186 are clocked by the data clock 112 which cycles at the baud rate on average. The output of the FIR filter is the interpolated data 102 substantially synchronized to the baud rate.

The implementation of the FIR filter shown in FIG. 10 assumes that ITR 100 and the down stream components would operate at the baud rate in processing the interpolated, synchronous samples 102 one at a time. However, in the preferred embodiment the interpolator 136 is designed to output multiple interpolated, synchronous samples 102 which are processed by the down stream components in parallel in order to clock the entire channel at significantly below the baud rate, thereby reducing the cost and complexity similar to the benefit derived from clocking the write circuitry 99 of FIG. 3 at significantly below the baud rate. Although processing the samples parallel reduces the necessary clocking speed while maintaining high throughput, it increases the amount of circuitry necessary to implement each component.

Figure 11:
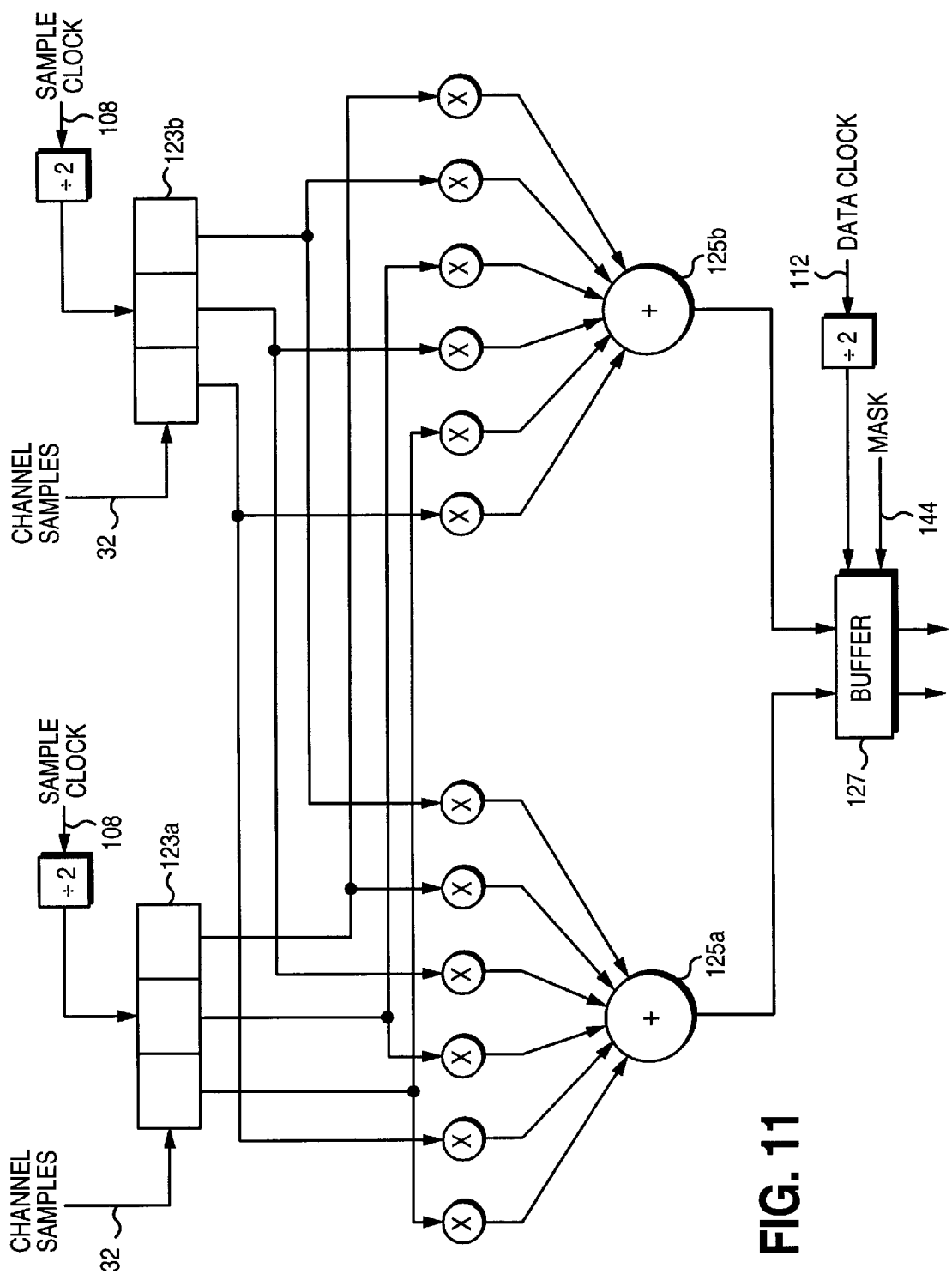
FIG. 11 shows how the FIR filter of FIG. 10 would be implemented to process multiple channel samples in parallel.

As an example, consider an FIR interpolation filter that processes two channel samples in parallel, as depicted in FIG. 11. The channel samples 32 are input into respective buffers 123a and 123b two at a time at every other sample clock (i.e., the buffers 123a and 123b are clocked at 1/2 the sample clock rate 108). The circuitry of FIG. 11 comprises a duplicate set of the convolution circuitry (multipliers and adders of FIG. 10) for processing the samples stored in the two buffers 123a and 123b in an interleaved manner as shown. The interpolated samples output from adders 125a and 125b are stored in a buffer 127 in the appropriate sequence as determined by the data clock 112 and the MASK signal 144. As discussed above, the interpolated samples are generated at a rate of . . . 2,1,2,1,2,1,2, . . . per sample clock period with the occasional decimation due to oversampling (i.e., . . . 2,1,2,1,1,2,1,2,1 . . . ). Thus, the data clock 112 and the MASK signal 144 are used to retrieve the interpolated samples from the appropriate FIR filter of FIG. 11 at the appropriate time and in the appropriate sequence.

The interpolated samples stored in the buffer 127 are then output two at a time for processing by the down stream components (gain control 50, discrete time sequence detector 34, data sync detector 66 and RLL decoder 36). Thus, the circuitry in the down stream components is also duplicated similar to the circuitry of FIG. 11 in order to process multiple samples at a time in an interleaved manner. This allows the data clock 112 (divided down appropriately) to clock the down stream components at a frequency significantly below the baud rate.

The objects of the invention have been fully realized through the embodiments disclosed herein. Those skilled in the art will appreciate that the various aspects of the invention can be achieved through different embodiments without departing from the essential function. For example, the present invention could be applied to a system where the user data is encoded according to a code constraint other than RLL d=1. In addition, those skilled in the art understand that the number of samples output by the ITR and processed in parallel by the down stream components could be increased to achieve an even greater reduction in clocking speed. These and other like modifications are within the scope of the present invention as is understood from reading the following claims.

We claim:

1. A sampled amplitude read/write channel for writing user data received from a host computer system to a disk storage medium and later reading the user data from the disk storage medium for transfer back to the host computer system, the read/write channel comprising:
   (a) a channel encoder for encoding the user data according to a code constraint to generate encoded data with a code rate less than unity;
   (b) write circuitry for writing the encoded data to the disk storage medium at a predetermined baud rate during a write operation, wherein the write circuitry is clocked at a frequency less than the baud rate;
   (c) a sampling device for sampling an analog read signal emanating from a read head positioned over the disk storage medium during a read operation to generate a sequence of discrete-time sample values; and
   (d) a discrete time detector for detecting an estimated data sequence from the discrete-time sample values.

2. The sampled amplitude read/write channel as recited in claim 1, further comprising a decoder for decoding the estimated data sequence into estimated user data.

3. The sampled amplitude read/write channel as recited in claim 1, wherein the code constraint is a run-length limited (RLL) code constraint of d>0.

4. The sampled amplitude read/write channel as recited in claim 3, wherein d=1.

5. The sampled amplitude read/write channel as recited in claim 1, wherein the sampling device samples the analog read signal at a frequency below 9/10 the baud rate.

6. The sampled amplitude read/write channel as recited in claim 1, wherein the sampling devices samples the analog read signal asynchronous to the baud rate to generate asynchronous sample values, further comprising an interpolating timing recovery circuit for interpolating the asynchronous sample values to generate synchronous sample values.

7. The sampled amplitude read/write channel as recited in claim 6, wherein the sampling device samples the analog read signal at a frequency below 9/10 the baud rate.

8. The sampled amplitude read/write channel as recited in claim 1, wherein the write circuitry comprises a mapper for mapping m bits of the encoded data into n bits of write data, wherein m>n.

9. The sampled amplitude read/write channel as recited in claim 8, wherein n/m equals the code rate.

10. The sampled amplitude read/write channel as recited in claim 8, further comprising a write clock generator for generating a write clock for clocking the write circuitry, wherein:
   (a) the write circuitry comprises a first delay element for delaying the write clock to generate a delayed write clock; and
   (b) a means for selecting between the write clock and the delayed write clock for use in writing a bit of the write data to the disk storage medium.

11. The sampled amplitude read/write channel as recited in claim 1, further comprising a write clock generator for generating a write clock for clocking the write circuitry, wherein the write circuitry comprises a first delay element for delaying the write clock to generate a delayed write clock.

12. A sampled amplitude read/write channel for writing user data received from a host computer system to a disk storage medium and later reading the user data from the disk storage medium for transfer back to the host computer system, the read/write channel comprising:
   (a) write circuitry for writing data to the disk storage medium at a predetermined baud rate during a write operation, wherein the write circuitry is clocked at a frequency less than the baud rate;
   (b) a sampling device for sampling an analog read signal emanating from a read head positioned over the disk storage medium during a read operation to generate a sequence of discrete-time sample values; and
   (c) a discrete time detector for detecting an estimated data sequence from the discrete-time sample values.

13. The sampled amplitude read/write channel as recited in claim 12, further comprising a channel encoder for encoding the user data according to a code constraint to generate encoded data with a code rate less than unity.

14. The sampled amplitude read/write channel as recited in claim 13, wherein the code constraint is a run-length limited (RLL) code constraint of d>0.

15. The sampled amplitude read/write channel as recited in claim 14, wherein d=1.

16. The sampled amplitude read/write channel as recited in claim 13, wherein the write circuitry comprises a mapper for mapping m bits of the encoded data into n bits of write data, wherein m>n.

17. The sampled amplitude read/write channel as recited in claim 16, wherein n/m equals the code rate.

18. The sampled amplitude read/write channel as recited in claim 16, further comprising a write clock generator for generating a write clock for clocking the write circuitry, wherein:

(a) the write circuitry comprises a first delay element for delaying the write clock to generate a delayed write clock; and (b) a means for selecting between the write clock and the delayed write clock for use in writing a bit of the write data to the disk storage medium.

19. The sampled amplitude read/write channel as recited in claim 12, wherein the sampling device samples the analog read signal at a frequency below 9/10 the baud rate.

20. The sampled amplitude read/write channel as recited in claim 12, wherein the sampling devices samples the analog read signal asynchronous to the baud rate to generate asynchronous sample values, further comprising an interpolating timing recovery circuit for interpolating the asynchronous sample values to generate synchronous sample values.

21. The sampled amplitude read/write channel as recited in claim 20, wherein the sampling device samples the analog read signal at a frequency below 9/10 the baud rate.

22. The sampled amplitude read/write channel as recited in claim 12, further comprising a write clock generator for generating a write clock for clocking the write circuitry, wherein the write circuitry comprises a first delay element for delaying the write clock to generate a delayed write clock.

23. A sampled amplitude read/write channel for writing user data received from a host computer system to a disk storage medium and later reading the user data from the disk storage medium for transfer back to the host computer system, the read/write channel comprising:

(a) a channel encoder for encoding m bits of the user data into n bits of encoded data, where m<n;

(b) write circuitry for generating a write clock and a delayed write clock for writing the encoded data to the disk storage medium at n bits per unit time during a write operation, wherein a frequency of the write clock is less than n bits per unit time;

(c) a sampling device for sampling an analog read signal emanating from a read head positioned over the disk storage medium during a read operation to generate a sequence of discrete-time sample values; and (d) a discrete time detector for detecting an estimated data sequence from the discrete-time sample values.

* * * * *